United States Patent
Yin et al.

(10) Patent No.: US 11,003,002 B1
(45) Date of Patent: May 11, 2021

(54) DISPLAY SUBSTRATE, DISPLAY PANEL, AND DISPLAY DEVICE

(71) Applicant: WUHAN CHINA STAR OPTOELECTRONICS TECHNOLOGY CO., LTD., Hubei (CN)

(72) Inventors: Bingkun Yin, Hubei (CN); Changchih Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/981,936

(22) PCT Filed: Jun. 23, 2020

(86) PCT No.: PCT/CN2020/097766
§ 371 (c)(1),
(2) Date: Sep. 17, 2020

(30) Foreign Application Priority Data

Apr. 2, 2020 (CN) .......................... 202010256340.6

(51) Int. Cl.
*G02F 1/1333* (2006.01)
*G02F 1/1335* (2006.01)

(52) U.S. Cl.
CPC .. *G02F 1/133302* (2021.01); *G02F 1/133504* (2013.01); *G02F 1/133528* (2013.01); *G02F 1/133553* (2013.01); *G02F 1/133548* (2021.01)

(58) Field of Classification Search
None
See application file for complete search history.

(56) References Cited

U.S. PATENT DOCUMENTS

| 2006/0215082 A1* | 9/2006 | Nakano | G02F 1/133555 349/113 |
| 2007/0285597 A1* | 12/2007 | Wu | G02F 1/1333 349/95 |
| 2018/0224701 A1* | 8/2018 | Shin | G02F 1/133553 |
| 2019/0011801 A1* | 1/2019 | Komanduri | G02F 1/134309 |

* cited by examiner

*Primary Examiner* — Phu Vu

(57) ABSTRACT

A display substrate, a display panel, and a display device are provided. The display substrate of the present invention can realize an integration of an optical film and optical path system of an original backlight module onto the display substrate by adding a first functional layer, a second functional layer, and a first polarizing layer. The display device uses the display substrate described in the present invention and adds an optical layer on the display substrate, so that the display device or a display apparatus can be thinned and lightened, and a reliability of a light source module can be improved.

14 Claims, 3 Drawing Sheets

DISPLAY SUBSTRATE, DISPLAY PANEL, AND DISPLAY DEVICE

CROSS REFERENCE TO RELATED APPLICATIONS

This application claims priority to Chinese patent application No. 202010256340.6, titled "Display Substrate, Display Panel, and Display Device" filed on Apr. 2, 2020 with the National Intellectual Property Administration, which is incorporated by reference in the present application in its entirety.

FIELD OF INVENTION

The present invention relates to the field of display technologies, and in particular, to a display substrate, a display panel, and a display device.

BACKGROUND OF INVENTION

With development of digital technologies, LCD products have been widely used in all aspects of daily life, and requirements for thinner and lighter liquid crystal display devices are also gradually increasing.

However, current liquid crystal display devices usually use structures with "liquid crystal display panels+backlight modules." FIG. 1 is a schematic structural view of a current liquid crystal display device. As shown in FIG. 1, the current display device comprises a display panel 20 and a backlight module 10 that provides external light to the display panel 20. The display panel 20 comprises a liquid crystal cell composed of an array substrate 21, an opposite substrate 22, and a liquid crystal layer 23, and a first polarizer 24 and a second polarizer 25 are disposed on opposite sides of the liquid crystal cell. The backlight module 10 comprises a backlight source 11, a light guide plate 12, a scattering layer 13, a reflection layer 14, a diffusion sheet 15, a first prism sheet 16, and a second prism sheet 17.

Technical Problem

It can be seen that in structures of current display devices, assembly processes of a backlight module 10 is complicated, and it is not conducive to lighter and thinner liquid crystal display devices.

Therefore, there is an urgent need to provide display substrates, display panels, and display devices that can effectively simplify the assembly processes and make the display devices lighter and thinner.

Technical Solution

An objective of the present invention is to solve the above-mentioned problems and provide a display substrate, a display panel, and a display device. By adding a first functional layer, a second functional layer, and a first polarizing layer to the display substrate, light passing through the display substrate can be adjusted, and finally make the display panel and the display device lighter and thinner.

In order to solve the above-mentioned problems, following technical solutions are used in the display substrate, display panel, and display device of the present invention.

The present invention provides a display substrate comprising a first base substrate and a functional device layer disposed on the first base substrate. The display substrate further comprises a first functional layer disposed on the first base substrate and located between the first base substrate and the functional device layer, wherein the first functional layer is provided with a plurality of optical structures in an array on a surface facing a second functional layer; and the second functional layer disposed on the first functional layer and located between the first functional layer and the functional device layer, wherein light incident through the first base substrate is concentrated by the optical structures and diffusely reflected to the second functional layer; wherein the first base substrate comprises a first refractive index a, the first functional layer comprises a second refractive index b, the second functional layer comprises a third refractive index c, and a, c, and b satisfy a following relationship: a≥c>b.

Further, the optical structures are prismatic structures or trapezoidal structures, a thickness of the optical structures is L1, a maximum width of the optical structures is L2, and L1≥0.5L2.

Further, the display substrate further comprises a first polarizing layer, wherein the first polarizing layer is disposed on the second functional layer and is located between the second functional layer and the functional device layer, and the first polarizing layer comprises a plurality of wire grid polarizers.

The present invention further provides a display panel comprising a display substrate comprising a first base substrate and a functional device layer disposed on the first base substrate. The display substrate further comprises a first functional layer disposed on the first base substrate and located between the first base substrate and the functional device layer; and a second functional layer disposed on the first functional layer and located between the first functional layer and the functional device layer; wherein light incident through the first base substrate diffusely reflects and refracts at a contact interface between the first functional layer and the second functional layer.

Further, the first functional layer is provided with a plurality of optical structures in an array on a surface facing the second functional layer, and the light incident through the first base substrate is concentrated by the optical structures and diffusely reflected to the second functional layer.

Further, the optical structures are prismatic structures or trapezoidal structures, a thickness of the optical structures is L1, a maximum width of the optical structures is L2, and L1≥10.5L2.

Further, the first base substrate comprises a first refractive index a, the first functional layer comprises a second refractive index b, the second functional layer comprises a third refractive index c, and a, c, and b satisfy a following relationship: a≥c>b.

Further, the display substrate further comprises a first polarizing layer, the first polarizing layer is disposed on the second functional layer and is located between the second functional layer and the functional device layer, and the first polarizing layer comprises a plurality of wire grid polarizers.

Further, the display panel further comprises an opposite substrate disposed opposite to the display substrate, wherein the opposite substrate comprises a second base substrate and a second polarizing layer disposed on the second base substrate.

The present invention further provides a display device comprising the display substrate or any one of the above display panels.

Further, the display device further comprises an opposite substrate disposed opposite to the display substrate, wherein the opposite substrate comprises a second base substrate and a second polarizing layer disposed on the second base substrate.

Further, the display device further comprises an optical layer disposed on a surface of the first base substrate facing away from the functional device layer, wherein an external light is incident on the first base substrate after being totally reflected by the optical layer.

Further, the optical layer comprises a plurality of scattering structures arranged in an array on a surface of the first base substrate facing away from the first functional layer, and the external light is incident on the first base substrate after being scattered through the plurality of scattering structures; and a reflective layer disposed on the scattering structures and covering the plurality of scattering structures and the surface of the first base substrate facing away from the first functional layer, and the external light is incident on the first base substrate after being totally reflected by the reflective layer.

Further, the display device further comprises a light source module configured to provide external light to the display panel. The light source module comprises a light source provided on a side of the display panel or the display substrate configured to provide the external light to the display panel or the display substrate; and a diffusion layer disposed between the light source and the display panel or the display substrate, configured to shorten a light mixing distance of the light source.

Beneficial Effect

A display substrate of the present invention is provided with a first functional layer and a second functional layer, so that light passing through the display substrate can be collected and adjusted, which can achieve effects of an optical function film or an optical path system in a current backlight module. By using a wire grid polarizer (WGP), the display substrate described in the present invention can achieve an objective of placing a polarizer on the display substrate. The display device described in the present invention uses the display substrate and adds an optical layer on the display substrate, and can achieve an integration of the optical function film layer or optical path system in the current backlight module on a display panel, and can be used for thinning and lightening of the display panel or display device, and can also be used to improve a problem of poor reliability of the current backlight module.

DETAILED DESCRIPTION OF PREFERRED EMBODIMENTS

The present invention provides a display substrate, a display panel, and a display device. In order to make purposes, technical solutions, and effects of the present invention clearer, the following will further explain the present invention in detail with reference to the drawings and examples. It should be understood that specific embodiments described here are only used to explain the present invention and not to limit the present invention.

Figure 1:
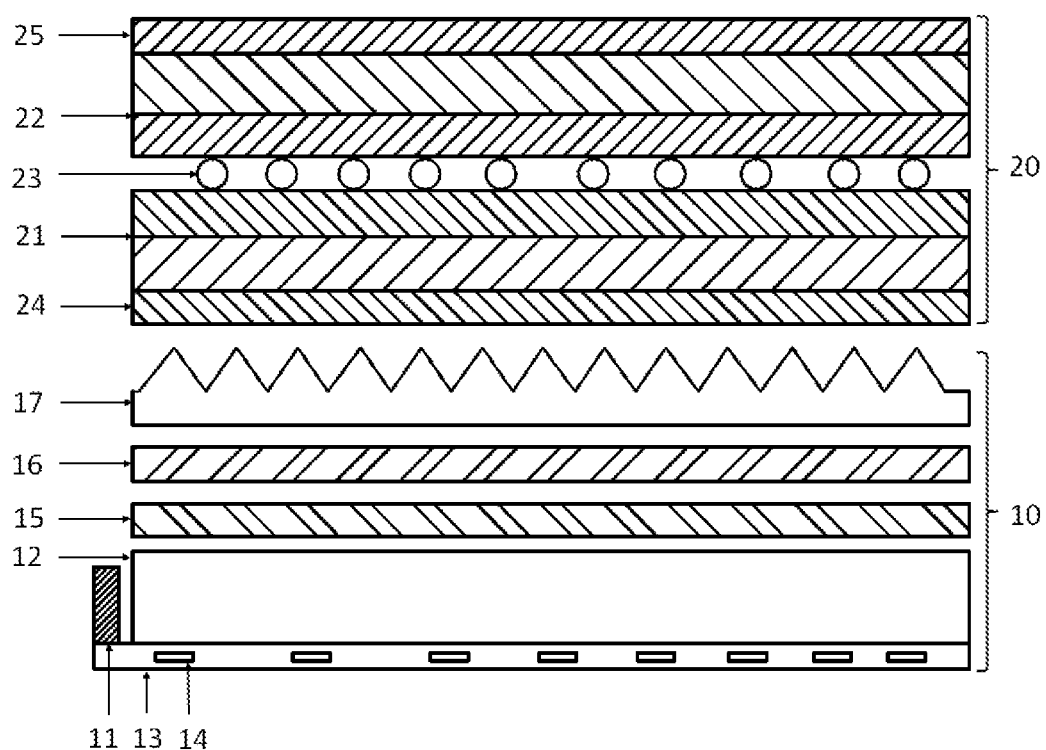
FIG. 1 is a schematic structural view of a current liquid crystal display device.
Figure 2:
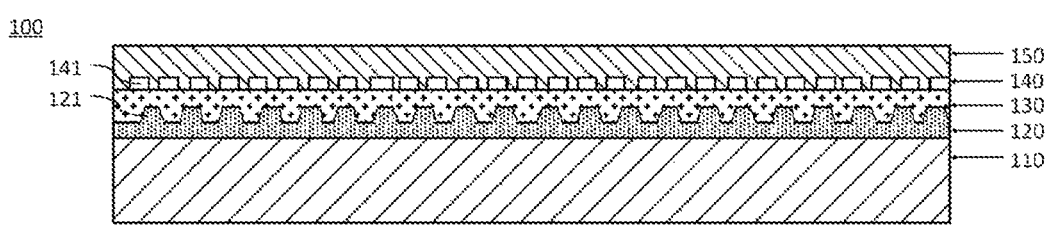
FIG. 2 is a schematic structural view of a display substrate of the present invention.
Figure 3:
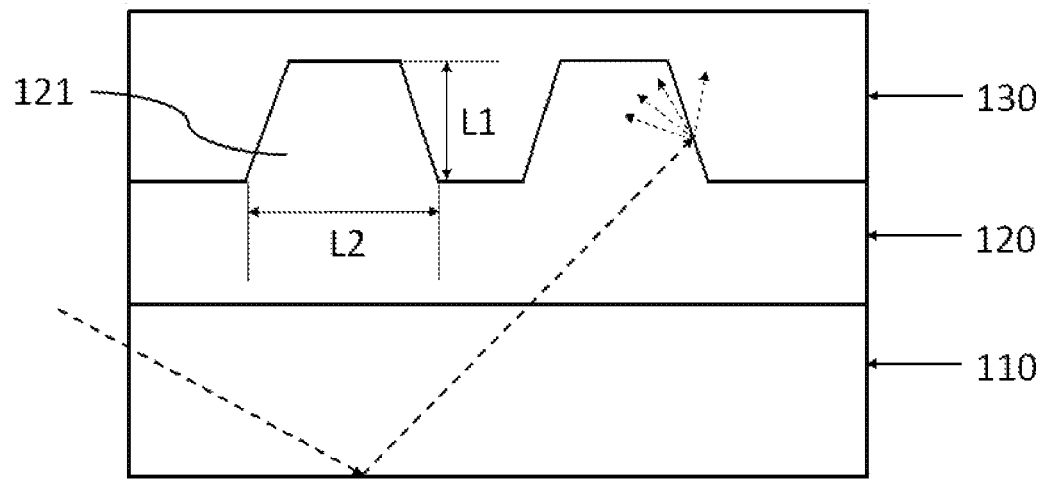
FIG. 3 is a light path view of the display substrate, in which a dotted line with arrow indicates light.

FIG. 2 is a schematic structural view of a display substrate of the present invention. FIG. 3 is a light path view of the display substrate, in which a dotted line with arrow indicates light. The present invention provides a display substrate 100. A structure of the display substrate 100 of the present invention will be described in detail below with reference to FIG. 2 and FIG. 3.

As shows in FIG. 2, the display substrate 100 comprises a first base substrate 110, a functional device layer 150 disposed on the first base substrate 110, a first functional layer 120 disposed on the first base substrate 110 and located between the first base substrate 110 and the functional device layer 150, and a second functional layer 130 disposed on the first functional layer 120 and located between the first functional layer 120 and the functional device layer 150. Wherein, light incident through the first base substrate 110 is diffusely reflected and refracted at a contact interface between the first functional layer 120 and the second functional layer 130.

By providing the first functional layer 120 and the second functional layer 130, the display substrate 100 of the present invention can concentrate and homogenize the light passing through the display substrate 100, and achieve the effect of the optical functional film or optical path system in the current backlight module.

The first base substrate 110 is configured to receive the light or allow the light to pass through. Specifically, the first base substrate 110 can guide the light, and can expand the light entering it.

In specific implementation, the first base substrate 110 uses a glass base substrate or a transparent flexible base substrate, which replaces a special light guide plate in the prior art and can eliminate the need for an additional light guide plate and reduce a thickness of a liquid crystal display. A material of the first base substrate 110 comprises but is not limited to polyimide.

As shown in FIG. 2 and FIG. 3, the first functional layer 120 is provided with a plurality of optical structures 121 in an array on a surface facing the second functional layer 130. The light incident through the first base substrate 110 is concentrated by the optical structures 121 and diffusely reflected to the second functional layer 130. In other words, the optical structures 121 are disposed to diffusely reflect and refract the light entering through the first base substrate 110, so that the light can be collected and uniformly distributed.

As shown in FIG. 2 and FIG. 3, the optical structure 121 is a prismatic structure or a trapezoidal structure, a thickness of the optical structure 121 is L1, a maximum width of the optical structure 121 is L2, and L1≥0.5L2. By controlling a size or shape of the optical structure 121, the diffuse reflection and refraction effect of the optical structure 121 on the light incident through the first base substrate 110 can be adjusted, and thus the uniformity and concentration of the light incident through the first base substrate 110 can be adjusted.

In other embodiments, the optical structure 121 can also use other lens structures.

As shown in FIG. 2 and FIG. 3, the second functional layer 130 fills between the adjacent optical structures 121 and covers the optical structure 121 and the first functional layer 120.

Specifically, the first base substrate 110 comprises a first refractive index a, the first functional layer 120 comprises a second refractive index b, the second functional layer 130 comprises a third refractive index c, and a, c, and b satisfy a following relationship: a≥c>b. That is, the refractive index of the first base substrate 110 is greater than or equal to the refractive index of the second functional layer 130, and the refractive index of the second functional layer 130 is greater than the refractive index of the first functional layer 120.

By adjusting the refractive indexes of the first base substrate 110, the first functional layer 120, and the second functional layer 130, the display substrate 100 of the present invention can control an adjustment of the light incident through the first base substrate 110 in the display substrate 100, and adjust the uniformity and concentration of the light passing through the display substrate 100.

Specifically, the first functional layer 120 can be obtained through a process of manufacturing a functional film layer for forming the first functional layer 120 and patterning the functional film layer. The second functional layer 130 can be formed by a chemical vapor deposition film forming process. The functional film layer used to form the first functional layer 120 can be formed by a magnetron sputtering method, and the patterning of the functional film layer can use a nanoimprint or dry etching process.

In specific implementation, the first functional layer 120 can be formed by a low-speed, medium-speed, and high-speed stepwise film formation process by controlling a speed of magnetron sputtering. In other embodiments, the first functional layer 120 can also be formed by a vacuum thermal evaporation method.

Specifically, the display substrate 100 further comprises a first polarizing layer 140. The first polarizing layer 140 is disposed on the second functional layer 130 and is located between the second functional layer 130 and the functional device layer 150, and comprises a plurality of wire grid polarizers (WGPs) 141.

By providing the first polarizing layer 140, the light incident through the first base substrate 110 can be polarized in a specific direction, and the above-mentioned polarized light can be provided to the functional device layer 150.

As shown in FIG. 2, the first polarizing layer 140 comprises the plurality of wire grid polarizers 141 arranged in an array. The wire grid polarizers 141 may be formed of a regular array of fine metal wires extending parallel to each other, and an interval of the metal wires does not exceed a wavelength of incident light.

By providing the wire grid polarizer 141, a traditional polarizer can be replaced, the light passing through the wire grid polarizer 141 can reach 143%, and an optical gain coefficient can reach 1.68. It can be seen that the wire grid polarizer 141 has better light recovery efficiency and can increase brightness of the light penetrating the display substrate 100.

In specific implementation, the display substrate 100 may comprise at least one passivation layer or an interlayer dielectric layer disposed between the first polarizing layer 140 and the functional device layer 150. The passivation layer or the interlayer dielectric layer may insulate the first polarizing layer 140 and the functional device layer 150 from each other.

In specific implementation, the first polarizing layer 140 can be formed by manufacturing a metal film layer and patterning the metal film layer. A method for manufacturing the metal film layer for forming the first polarizing layer 140 belongs to a conventional technical means in the art, and will not be repeated here.

In the embodiment, the patterning of the metal film layer forming the first polarizing layer 140 can be achieved by nanoimprinting or dry etching process. In other embodiments, the first polarizing layer 140 may be formed by patterning performed by photolithography.

In specific implementation, the first polarizing layer 140 is selected from one or more of aluminum (Al), gold (Au), silver (Ag), copper (Cu), chromium (Cr), iron (Fe) and/or nickel (Ni).

Specifically, the functional device layer 150 comprises a plurality of functional devices arranged in an array. The functional device may be a thin film transistor for switching or display driving, or a color filter for color filtering.

In the embodiment, the functional device layer 150 is a thin film transistor layer, that is, the functional device is a thin film transistor. In specific implementation, the functional device layer can be produced through film formation, exposure, development and etching processes.

By arranging the first functional layer 120, the second functional layer 130, and the first polarizing layer 140, the light incident from the first base substrate 110 can be diffusely reflected and refracted at the contact interface of the first functional layer 120 and the second functional layer 130, so that the light transmitted through the display substrate 100 is uniform and concentrated, and finally achieve the function of the optical film or optical path system in the current backlight module, and can be used to realize a thinning and lightweight design of display panels and display devices.

Figure 4:
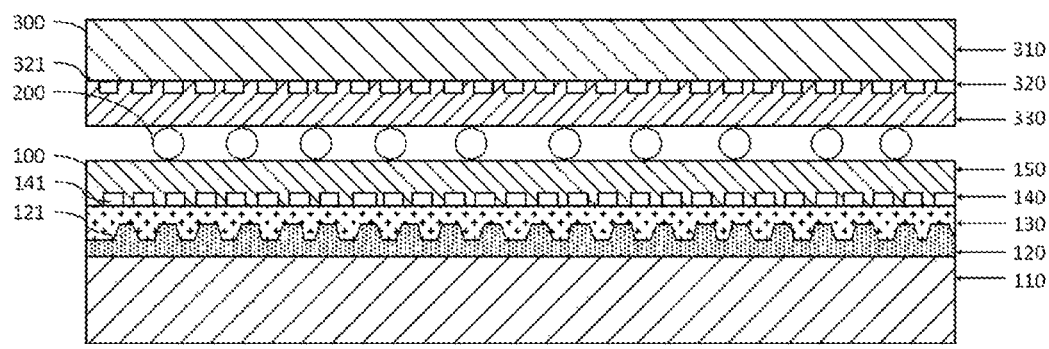
FIG. 4 is a schematic structural view of a display panel of the present invention

FIG. 4 is a schematic structural view of the display panel of the present invention. As shown in FIG. 4, the present invention provides a display panel that includes the display substrate 100 of the present invention, an opposite substrate 300 that is disposed opposite to the display substrate 100, and a liquid crystal 200 disposed between the display substrate 100 and the opposite substrate 300.

By using the display substrate 100 of the present invention, the display panel of the present invention can adjust the light entering the display panel through the display substrate 100, so that the light entering the display panel through the display substrate 100 is more uniform and concentrated, so as to achieve the effect of the optical film or optical path system in the current backlight module, which can be used to realize the thinning and lightweight design of the display devices or the display modules.

As shown in FIG. 4, the opposite substrate 300 comprises a second base substrate 310, and a second polarizing layer 320 disposed on the second base substrate 310.

In the embodiment, the second polarizing layer 320 comprises a plurality of wire grid polarizers 321.

As shown in FIG. 4, the opposite substrate 300 further comprises a color filter layer 330. The color filter layer 330 is disposed on a side of the second polarizing layer 320 away from the second base substrate 310.

In specific implementation, the opposite substrate 300 can be manufactured through processes such as film formation, exposure, and development.

Figure 5:
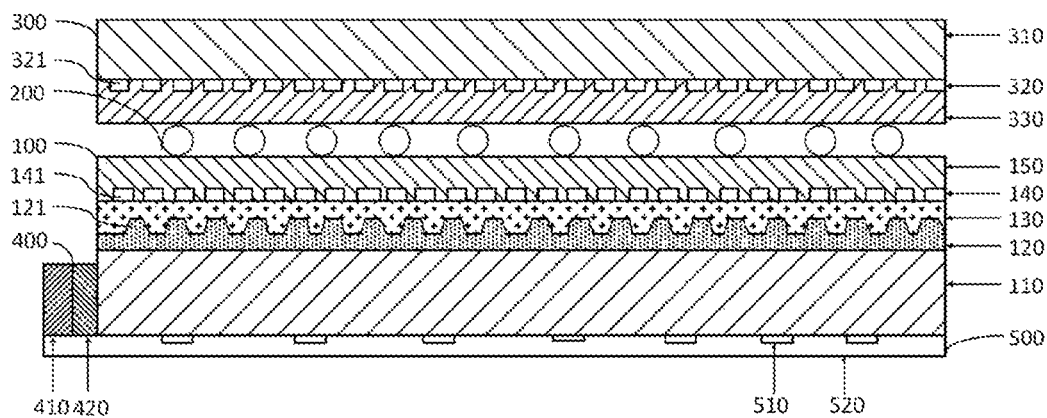
FIG. 5 is a schematic structural view of a display device of the present invention.

FIG. 5 is a schematic structural view of the display device of the present invention. As shown in FIG. 5, the present invention provides a display device. The display device of the present invention comprises the display panel of the present invention or the display substrate 100 of the present invention.

Figure 6:
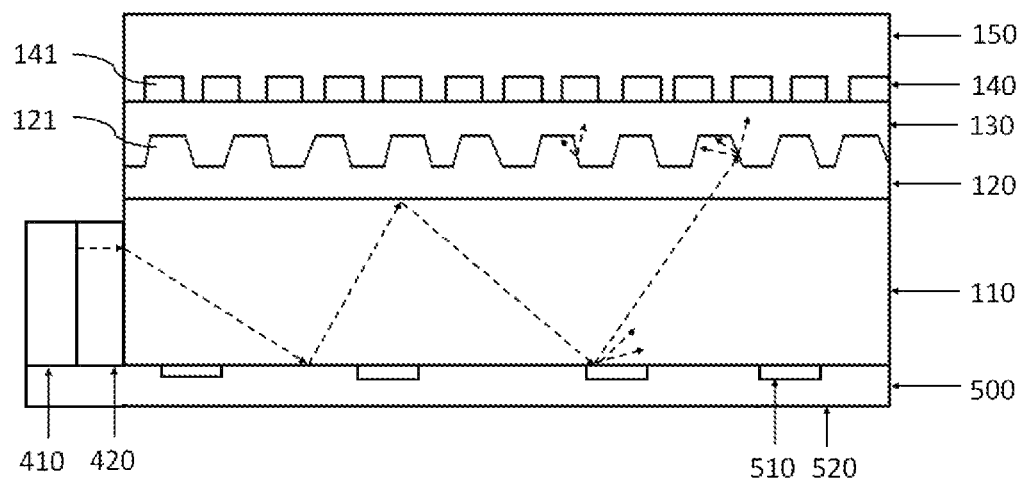
FIG. 6 is a light path view in the display substrate of the display device, in which a dotted line with arrow indicates the light.

As shown in FIG. 5 and FIG. 6, the display device further comprises an optical layer 500. The optical layer 500 is disposed on a surface of the first base substrate 110 away from the functional device layer 150. An external light is incident on the first base substrate 110 after being totally reflected by the optical layer 500. In other words, the optical layer 500 is used to totally reflect the light entering through the first base substrate 110 and reflect it onto the first base substrate 110.

As shown in FIG. 5 and FIG. 6, the optical layer 500 comprises a plurality of scattering structures 510 and a reflective layer 520.

As shown in FIG. 5 and FIG. 6, the plurality of scattering structures 510 are arranged in an array on a surface of the first base substrate 110 facing away from the first functional layer 120, and the external light is incident on the first base substrate 110 after being scattered through the plurality of scattering structures 510.

By disposing the scattering structures 510, it is possible to reflect parallel light at a relatively long distance and destroy the total reflection of the external light in the reflective layer 520 to uniformly emit the external light from the surface of the first base substrate 110. It is beneficial to improve the three-dimensional effect and uniformity of the light output by the display substrate 100.

As shown in FIG. 5 and FIG. 6, the reflective layer 520 is disposed on the scattering structures 510 and covers the plurality of scattering structures 510 and the surface of the first base substrate 110 facing away from the first functional layer 120, and the external light is incident on the first base substrate 110 after being totally reflected by the reflective layer 520.

As shown in FIG. 6, the reflective layer 520 can totally reflect the external light passing through the first base substrate 110 back into the first base substrate 110, so that it can completely pass through the side of the first base substrate 110 facing the first functional layer 120, which increases light output brightness of the first base substrate 110. At the same time, multiple reflections of the external light by the reflective layer 520 can travel along a length direction of the optical layer 500, so that the external light is uniformly distributed and emitted in the optical layer 500, which is beneficial to the uniform emission of the external light from the first base substrate 110 to achieve a light emission effect similar to a "surface light source."

Specifically, the reflective layer 520 is a metal reflective layer. That is, the reflective layer 520 is composed of a metal film layer. In other words, the reflective layer 520 is formed by stacking one or more metal film layers.

In the embodiment, the metal forming the reflective layer 520 is selected from aluminum (Al) or silver (Ag). During specific implementation, the reflective layer 520 can be formed by means of PVD process deposition.

As shown in FIG. 5, the display device further comprises a light source module 400. The light source module 400 is disposed on a side surface of the display panel or the display substrate 100, and is used to provide the external light to the display panel or the display substrate 100.

Specifically, the light source module 400 is disposed on the side surface of the first base substrate 110, and the light of the light source module 400 can enter the display panel or the display substrate 100 from the first base substrate 110.

Please continue to refer to FIG. 5, the light source module 400 comprises a light source 410 configured to provide the external light and a diffusion layer 420 disposed between the light source 410 and the display panel or the display substrate 100. By providing the diffusion layer 420, a light mixing distance of the light source 410 can be shortened.

In specific implementation, the light source 410 can be an edge light source, such as but not limited to an LED light strip. A material of the diffusion layer 420 is selected from one or more of PP plastic, PET plastic, and HDPE plastic.

As shown in FIG. 6, the external light provided by the light source 410 enters the display substrate 100 from the first base substrate 110. The external light entering the display substrate 100 passes through the first base substrate 110 and enters the first functional layer 120 after being scattered and totally reflected by the optical layer 500. The external light is refracted and diffusely reflected at the contact interface between the first functional layer 120 and the second functional layer 130 and then exits through the second functional layer 130. When the external light exits through the display substrate 100, the light distribution is uniform and concentrated, and is provided to the liquid crystal layer 200 with an emission effect similar to the "surface light source."

It can be seen that by using the display substrate 100 of the present invention and adding the optical layer 500 to the display substrate 100, the display device of the present invention can integrate the optical film and light path system in the current backlight module on the display panel, realize the lightweight and thinning of the display device or the display device, and can also solve a problem of poor reliability of the current backlight module.

For the specific implementation of the above operations, please refer to the previous embodiments, and will not be repeated here.

It will be understood that it is possible for those of ordinary skill in the art to substitute or alter the technical solution of the present invention and its inventive concept in accordance with the same, and that all such alterations or substitutions shall be within the scope of protection of the claims appended to the present invention.

What is claimed is:

1. A display substrate, comprising:
   a first base substrate and a functional device layer disposed on the first base substrate, wherein the display substrate further comprises:
   a first functional layer disposed on the first base substrate and located between the first base substrate and the functional device layer, wherein the first functional layer is provided with a plurality of optical structures in an array on a surface facing a second functional layer; and
   the second functional layer disposed on the first functional layer and located between the first functional layer and the functional device layer, wherein light incident through the first base substrate is concentrated by the optical structures and diffusely reflected to the second functional layer;
   wherein the first base substrate comprises a first refractive index a, the first functional layer comprises a second refractive index b, the second functional layer comprises a third refractive index c, and a, c, and b satisfy a following relationship: $a \geq c > b$.

2. The display substrate as claimed in claim 1, wherein the optical structures are prismatic structures or trapezoidal structures, a thickness of the optical structures is L1, a maximum width of the optical structures is L2, and $L1 \geq 0.5 L2$.

3. The display substrate as claimed in claim 1, further comprising a first polarizing layer, wherein the first polarizing layer is disposed on the second functional layer and is located between the second functional layer and the functional device layer, and the first polarizing layer comprises a plurality of wire grid polarizers.

4. A display panel, comprising:
a display substrate comprising a first base substrate and a functional device layer disposed on the first base substrate, wherein the display substrate further comprises:
a first functional layer disposed on the first base substrate and located between the first base substrate and the functional device layer; and
a second functional layer disposed on the first functional layer and located between the first functional layer and the functional device layer;
wherein light incident through the first base substrate diffusely reflects and refracts at a contact interface between the first functional layer and the second functional layer.

5. The display panel as claimed in claim 4, wherein the first functional layer is provided with a plurality of optical structures in an array on a surface facing the second functional layer, and the light incident through the first base substrate is concentrated by the optical structures and diffusely reflected to the second functional layer.

6. The display panel as claimed in claim 5, wherein the optical structures are prismatic structures or trapezoidal structures, a thickness of the optical structures is L1, a maximum width of the optical structures is L2, and L1≥13.5L2.

7. The display panel as claimed in claim 4, wherein the first base substrate comprises a first refractive index a, the first functional layer comprises a second refractive index b, the second functional layer comprises a third refractive index c, and a, c, and b satisfy a following relationship: a≥c>b.

8. The display panel as claimed in claim 4, wherein the display substrate further comprises a first polarizing layer, the first polarizing layer is disposed on the second functional layer and is located between the second functional layer and the functional device layer, and the first polarizing layer comprises a plurality of wire grid polarizers.

9. The display panel as claimed in claim 4, further comprising an opposite substrate disposed opposite to the display substrate, wherein the opposite substrate comprises a second base substrate and a second polarizing layer disposed on the second base substrate.

10. A display device, comprising the display substrate as claimed in claim 4.

11. The display device as claimed in claim 10, further comprising an opposite substrate disposed opposite to the display substrate, wherein the opposite substrate comprises a second base substrate and a second polarizing layer disposed on the second base substrate.

12. The display device as claimed in claim 10, further comprising an optical layer disposed on a surface of the first base substrate facing away from the functional device layer, wherein an external light is incident on the first base substrate after being totally reflected by the optical layer.

13. The display device as claimed in claim 12, wherein the optical layer comprises:
a plurality of scattering structures arranged in an array on the surface of the first base substrate facing away from the first functional layer, and the external light is incident on the first base substrate after being scattered through the plurality of scattering structures; and
a reflective layer disposed on the scattering structures and covering the plurality of scattering structures and the surface of the first base substrate facing away from the first functional layer, and the external light is incident on the first base substrate after being totally reflected by the reflective layer.

14. The display device as claimed in claim 10, further comprising a light source module configured to provide external light to the display panel, wherein the light source module comprises:
a light source provided on a side of the display panel or the display substrate configured to provide the external light to the display panel or the display substrate; and
a diffusion layer disposed between the light source and the display panel or the display substrate, configured to shorten a light mixing distance of the light source.

* * * * *